(12) United States Patent
Matsuo

(10) Patent No.: US 11,470,205 B1
(45) Date of Patent: Oct. 11, 2022

(54) INSPECTION SYSTEM, DESIGN APPARATUS, AND INSPECTION METHOD THAT GENERATE CORRECT ANSWER DATA WITH DESIGN APPARATUS FOR PRODUCTION PRINTING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/491,414

(22) Filed: Sep. 30, 2021

(51) Int. Cl.
| | |
|---|---|
| *H04N 1/00* | (2006.01) |
| *G06T 7/00* | (2017.01) |
| *H04N 1/387* | (2006.01) |
| *G06K 15/02* | (2006.01) |
| *G06F 3/12* | (2006.01) |

(52) U.S. Cl.
CPC ....... *H04N 1/00015* (2013.01); *G06F 3/1208* (2013.01); *G06F 3/1243* (2013.01); *G06K 15/1815* (2013.01); *G06K 15/1885* (2013.01); *G06T 7/001* (2013.01); *H04N 1/0005* (2013.01); *H04N 1/00037* (2013.01); *H04N 1/00053* (2013.01); *H04N 1/00058* (2013.01); *H04N 1/00087* (2013.01); *H04N 1/00456* (2013.01); *H04N 1/3871* (2013.01); *G06T 2207/30144* (2013.01)

(58) Field of Classification Search
CPC .......... H04N 1/00015; H04N 1/00031; H04N 1/00034; H04N 1/00037; H04N 1/00039; H04N 1/0005; H04N 1/00053; H04N 1/00058; H04N 1/00068; H04N 1/00074; H04N 1/00082; H04N 1/3871; G06K 15/1815; G06F 3/1243; G06T 7/0002; G06T 7/001
See application file for complete search history.

(56) References Cited

U.S. PATENT DOCUMENTS

2020/0128135 A1* 4/2020 Matsushita ........... G06F 3/1208

FOREIGN PATENT DOCUMENTS

JP     2012-000876 A     1/2012

* cited by examiner

*Primary Examiner* — Scott A Rogers
(74) *Attorney, Agent, or Firm* — Hawaii Patent Services; Nathaniel K. Fedde; Kenton N. Fedde

(57) ABSTRACT

Provided is an inspection system that can inspect variable printing in production printing with a plurality of apparatuses. This system is the inspection system that includes a design apparatus and an inspection apparatus for production printing. The design unit designs variable print data. The correct answer generation unit generates correct answer data for inspection when the variable print data is created by the design unit. The correct answer change unit acquires the processing information at the time of prepress and reflects it in the correct answer data generated by the correct answer generating unit. The output unit outputs the correct answer data changed by the correct answer change unit. The inspection unit inspects the printed matter based on the correct answer data generated by the design apparatus.

15 Claims, 8 Drawing Sheets

INSPECTION SYSTEM, DESIGN APPARATUS, AND INSPECTION METHOD THAT GENERATE CORRECT ANSWER DATA WITH DESIGN APPARATUS FOR PRODUCTION PRINTING

BACKGROUND

The present disclosure especially relates to an inspection system, a design apparatus, and an inspection method including a design apparatus and an inspection apparatus for production printing.

In industrial printing called "production printing" by using a commercial (industrial) printing apparatus, an inspection apparatus for inspecting printed matter is used. In this inspection, the scanned image of the printed matter is checked by comparing the correct image prepared in advance. However, with regard to variable printing, the inspection by simple image comparison is difficult because variable data, which is different data for each part, is added.

As a typical technology, an invention for creating a correct image for inspection by RIP (Raster Image Processor) processing is described. In this technology, RIP processing is performed, a fixed area, a variable area, and a margin area are determined to create a correct image, and the variable area is excluded during the inspection process for inspection. That is, this technology presupposes only the case where variable printing is executed by one printing apparatus.

SUMMARY

An inspection system according to the present disclosure is an inspection system having a design apparatus and an inspection apparatus for production printing, wherein the design apparatus includes: a design unit that designs variable print data, a correct answer generation unit that generates correct answer data for inspection when the variable print data is created by the design unit, a correct answer change unit that acquires processing information at the time of prepress and reflects in the correct answer data generated by the correct answer generation unit, and an output unit that outputs the correct answer data changed by the correct answer change unit; and the inspection apparatus includes: an inspection unit that inspects based on the correct answer data generated by the design apparatus.

A design apparatus according to the present disclosure is a production printing design apparatus includes a design unit that designs variable print data; a correct answer generation unit that generates correct answer data for inspection when the variable print data is created by the design unit; a correct answer change unit that acquires processing information at the time of prepress and reflects it in the correct answer data generated by the correct answer generation unit; and an output unit that outputs the correct answer data changed by the correct answer change unit.

An inspection method of the present disclosure is an inspection method executed by an inspection system having a design apparatus and an inspection apparatus for production printing, including the steps of: by the design apparatus, designing variable print data; by the design apparatus, generating correct answer data for inspection when the variable print data is created; by the design apparatus, acquiring the processing information at the time of prepress and reflecting in generated the correct answer data; by the design apparatus, outputting changed the correct answer data; and by the inspection apparatus, inspecting based on the correct answer data generated by the design apparatus.

DETAILED DESCRIPTION

Embodiment

[Configuration of Image Forming System X]

Figure 1:
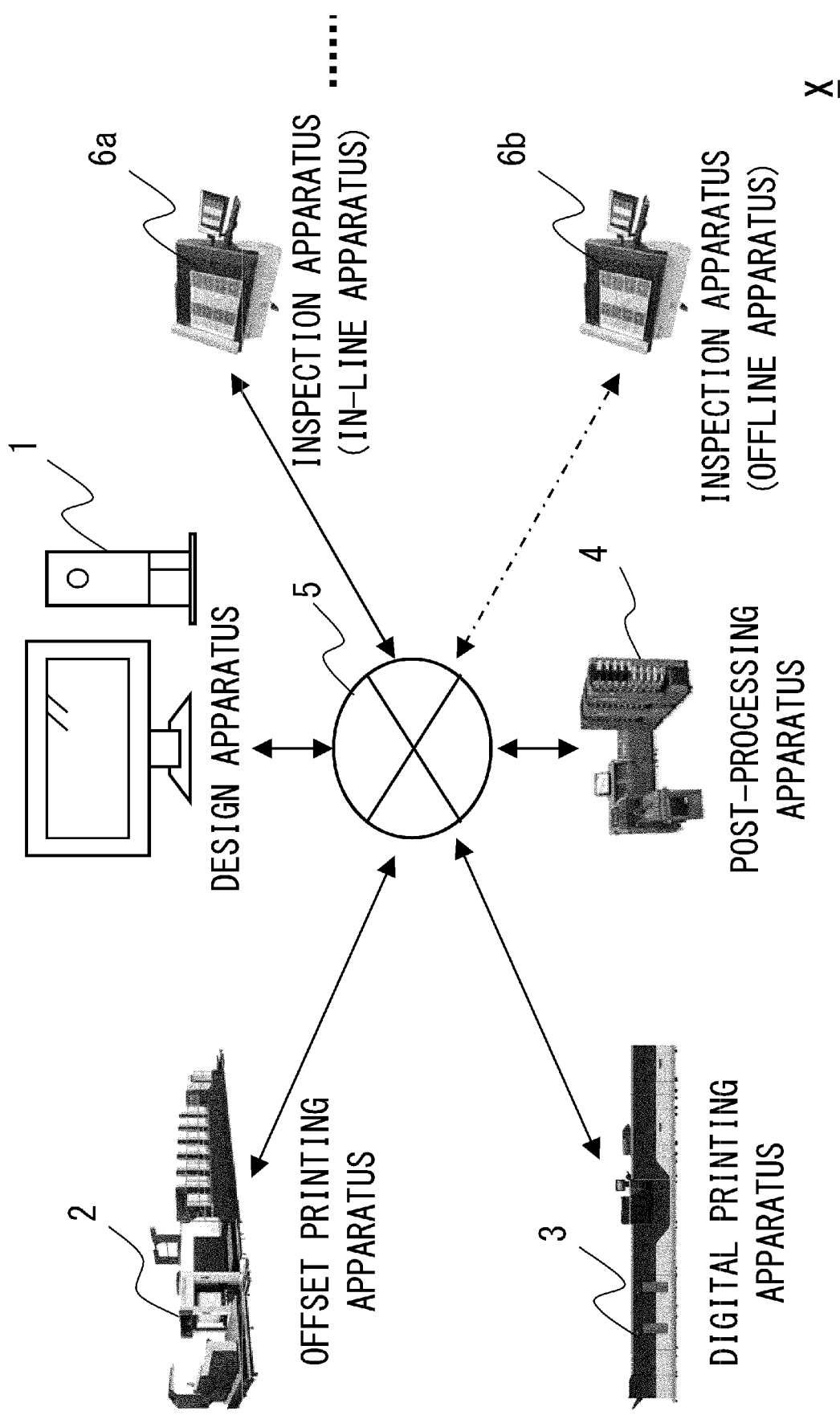
FIG. 1 is a system configuration diagram of an image forming system according to an embodiment of the present disclosure.
Figure 2:
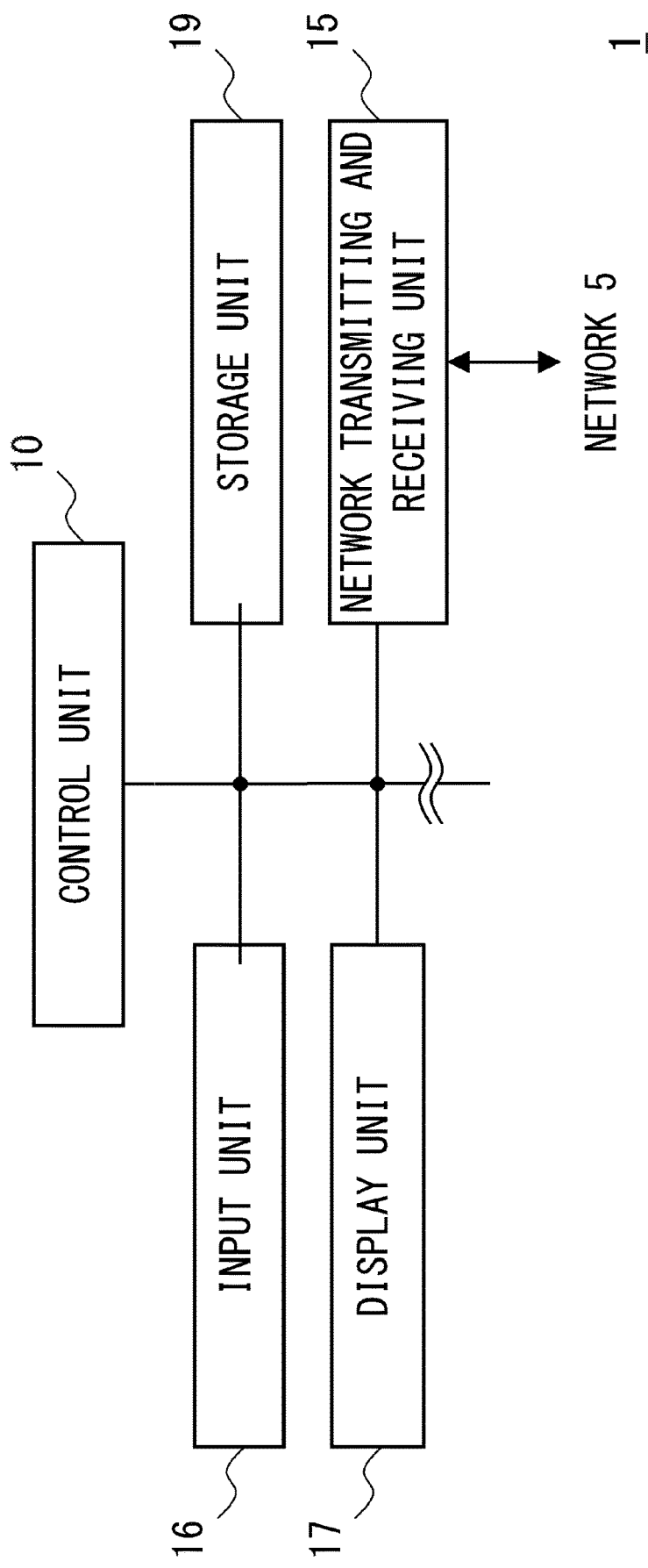
FIG. 2 is a block diagram showing a control configuration of the design apparatus as shown in FIG. 1.

Firstly, with reference to FIG. 1, the overall system configuration of the image forming system X according to the present embodiment is described.

The image forming system X according to the present embodiment is a system that performs design, printing, and inspection in industrial printing (production printing). In production printing, the components of the final product are produced by dividing the labor in multiple processes. For example, in the case of bookbinding, the cover, the body (color), the body (black and white), the promotional material, the band, the shipping envelope, and the like, are processed as different jobs. Then, in the middle of the process, each job is combined and finished as a final product book (printed matter). This printed matter is inspected, for example, before or after the after-treatment process (post-processing).

Here, in the image forming system X of the present embodiment, the final product such as an output book is set as an "order", and each component of the order is set as a job.

Further, in the present embodiment, the image forming system X is an example of the inspection system according to the present embodiment. That is, in the following embodiments, the inspection process by the image forming system X is mainly focused and described.

The image forming system X includes a design apparatus 1, an offset printing apparatus 2, a digital printing apparatus 3, a post-processing apparatus 4, an inspection apparatus 6a (in-line apparatus), and an inspection apparatus 6b (offline apparatus). Each apparatus except the inspection apparatus 6b is connected with the network 5.

The design apparatus 1 is an information processing apparatus such as a PC (Personal Computer), a smartphone, a tablet terminal, a PDA (Personal Data Assistant), or the like. The design apparatus 1 can be designed for variable printing by the image forming system X.

Specifically, the design apparatus 1 executes a design application software (hereinafter, application software is simply referred to as an "application"), which is a dedicated design application for designing variable printing.

Further, the design apparatus 1 can also execute a prepress application that controls a prepress for production printing.

In addition, the design apparatus 1 may have a function of a management apparatus that manages the status of each apparatus and requests processing for an order or a job.

The offset printing apparatus 2 is an automated printing apparatus that performs offset printing for printing a large amount (many lots).

The digital printing apparatus 3 is an industrial printer, or the like, that prints a smaller lot than the offset printing apparatus 2.

The digital printing apparatus 3 according to the present embodiment may be different from the offset printing apparatus 2 in the size, paper quality, recordable range, and the like of the recording paper used for printing.

The post-processing apparatus 4 is various apparatuses for performing post-processing such as folding, collating, bookbinding, and cutting of recording paper printed by the offset printing apparatus 2 or the digital printing apparatus 3.

The network 5 includes a LAN (Local Area Network), a wireless LAN (Wi-Fi), a WAN (Wide Area Network), a mobile phone network, an industrial network, a voice phone network, and other dedicated line(s). The network 5 can send and receive various commands and data to and from each apparatus except the inspection apparatus 6b.

The inspection apparatus 6a (in-line apparatus) is connected with the network 5 and is an apparatus for inspecting the printed matter before or after treatment. The inspection apparatus 6a acquires the correct answer data 320 (FIG. 5) from the design apparatus 1 and inspects the printed matter by the variable printing.

The inspection apparatus 6b (offline apparatus) is an inspection apparatus that is not directly connected with the network 5. With respect to this inspection apparatus 6b, a printed matter on which the correct answer data 320 is printed is acquired and scanned, and it inspects the printed matter by the variable printing.

Hereinafter, if any one of the inspection apparatus 6a and the inspection apparatus 6b is described, it is simply referred as the inspection apparatus 6.

In addition, in the image forming system X, a plurality of these apparatuses may exist depending on the application, the scale of printing, and the like.

In addition to this, the image forming system X includes various component apparatuses that execute various jobs of production printing and are managed by the design apparatus 1. This component apparatus includes, for example, a terminal for entry, a terminal for design proofreading, a prepress apparatus, a server for managing shipping, and the like.

Each apparatus may be connected with the design apparatus 1 via the network 5. Alternatively, the design apparatus 1 and each apparatus may be directly connected by wire using various interfaces.

Here, the inspection system according to the present embodiment may have a configuration that mainly includes the design apparatus 1 and the inspection apparatus 6 in the image forming system X.

Figure 3:
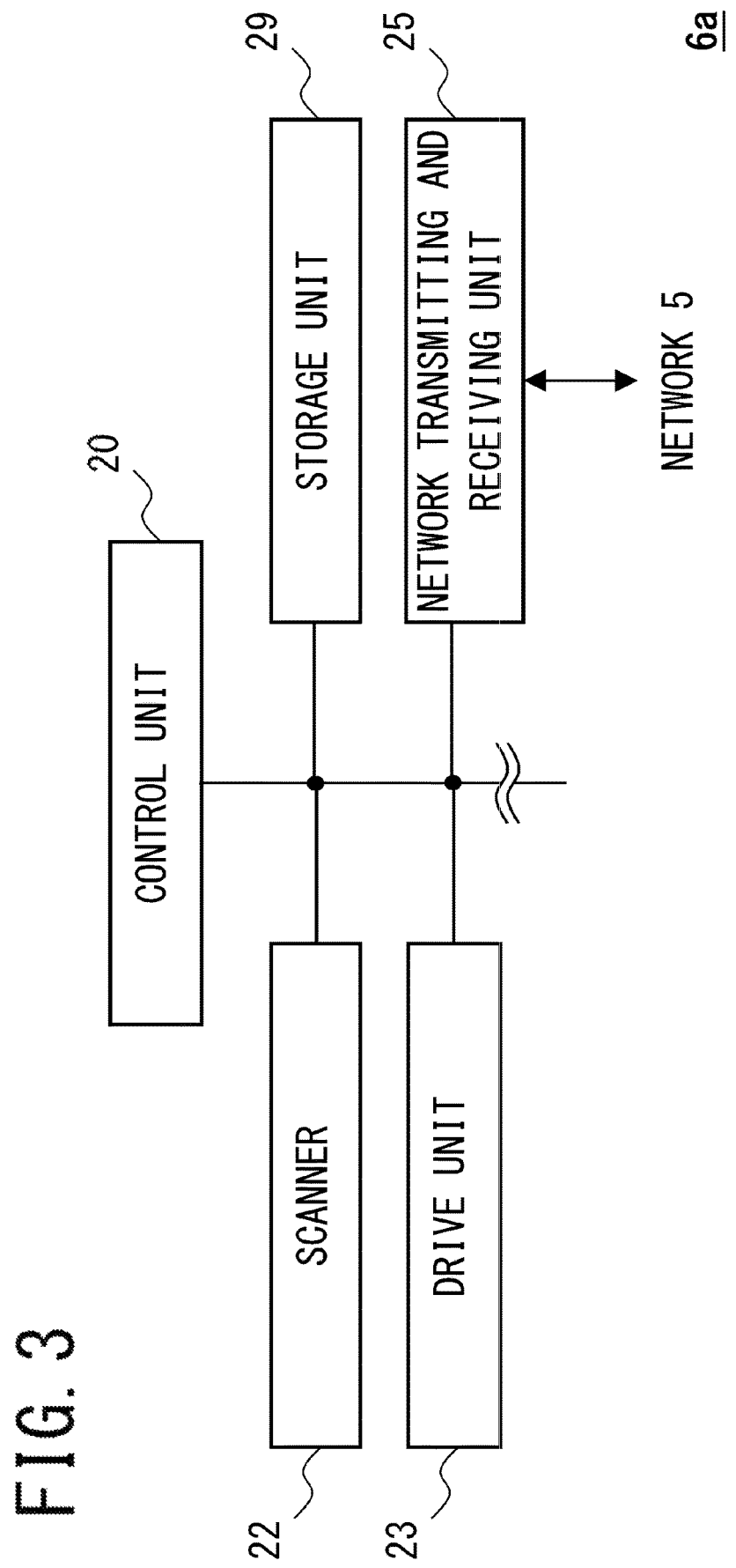
FIG. 3 is a block diagram showing a control configuration of the inspection apparatus of the in-line apparatus as shown in FIG. 1.

Next, with reference to FIG. 3, the control configuration of the design apparatus 1 is described.

The design apparatus 1 includes a control unit 10, a network transmitting and receiving unit 15, an input unit 16, a display unit 17, and a storage unit 19. Each unit is connected with the control unit 10 and its operation is controlled by the control unit 10.

The control unit 10 is an information processing unit such as a CPU (Central Processing Unit), an MPU (Micro Processing Unit), a DSP (Digital Signal Processor), a GPU (Graphics Processing Unit), an ASIC (Application Specific Integrated Circuit), or the like.

The control unit 10 reads out the control program stored in the ROM or HDD of the storage unit 19, expands the control program in the RAM, and executes it, so that the control unit 10 can be operated as each part of the functional block as described later. Further, the control unit 10 controls the entire apparatus according to instruction information input from the input unit 16.

The network transmitting and receiving unit 15 is a circuit, or the like, that transmits/receives data to/from each apparatus via the network 5. The network transmitting and receiving unit 15 includes a LAN (Local Area Network) board, a wireless transmitter/receiver, a USB (Universal Serial Bus) interface, and the like.

The input unit 16 is an input device including a touch panel, a keyboard, buttons, a mouse, a touch pad, an optical or electromagnetic digitizer, other pointing device(s), or the like, for performing operations by the user.

The display unit 17 is a display device such as an LCD (Liquid Crystal Display), an organic EL display (Organic Electro-Luminescence Display), and an LED (Light Emitting Diode).

The input unit 16 and the display unit 17 may be integrally formed so that the input unit 16 can detect the position (coordinates) on the display unit 17.

The storage unit 19 is a non-transitory recording medium such as a semiconductor memory, which is a ROM (Read Only Memory), a RAM (Random Access Memory), or the like, an HDD (Hard Disk Drive), an optical recording medium, a magnetic tape device, or the like. In addition, the storage unit 19 may also include an external recording medium such as a flash memory card, a USB memory, an optical disk apparatus, or the like.

The storage unit 19 stores an OS (Operating System) for making the design apparatus 1 function as a computer, various applications, other programs and data, and the like. These various applications include design application and prepress application.

Figure 4:
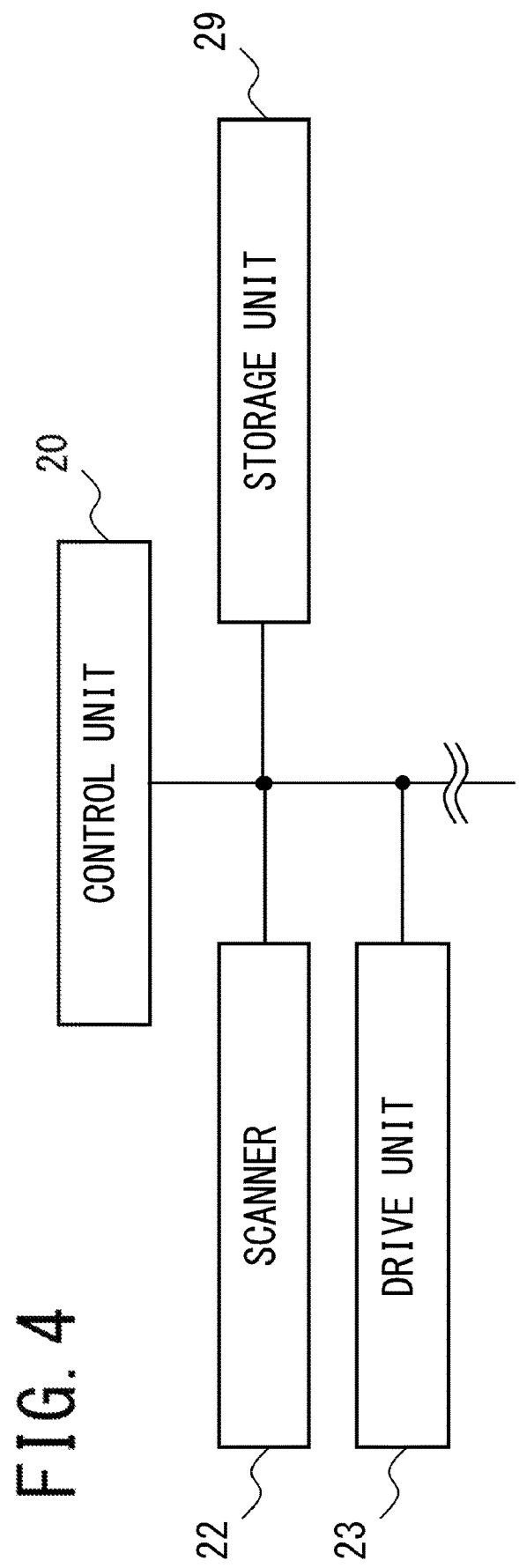
FIG. 4 is a block diagram showing a control configuration of the inspection apparatus of the offline apparatus as shown in FIG. 1.

Next, the control configurations of the inspection apparatus 6a and the inspection apparatus 6b is described with reference to FIGS. 4 and 5.

The inspection apparatus 6a includes a control unit 20, a scanner 22, a drive unit 23, a network transmitting and receiving unit 25, and a storage unit 29.

The inspection apparatus 6b includes a control unit 20, a scanner 22, a drive unit 23, and a storage unit 29.

That is, in the present embodiment, the inspection apparatus 6a and the inspection apparatus 6b mainly differ in the configuration of whether or not the network transmitting and receiving unit 25 is included.

The control unit 10 is an information processing unit such as a CPU, MPU, DSP, GPU, ASIC, or the like.

The control unit 20 reads out the control program stored in the ROM or HDD of the storage unit 19, expands the control program in the RAM, and executes the control program, so that the control unit 10 can be operated as each part of the functional block as described later. Further, the control unit 10 controls the entire apparatus according to instruction information input from the design apparatus 1 or the operation panel unit.

The scanner 22 is a unit that reads the set printed matter. In the present embodiment, the scanner 22 may include a CCD (Charge Coupled Device), a CMOS (Complementary Metal Oxide Semiconductor) image sensor, a polygon mirror, a photodetector, and the like.

The scanner 22 reads the printed matter in synchronization with the operation of transporting the printed matter by the drive unit 23, and it acquires image data. The scanner 22 stores the acquired image data in the storage unit 29.

The drive unit 23 is a drive unit that drives a transport mechanism that transports the printed matter read by the scanner 22.

The drive unit 23 feeds a sheet of the printed matter to the scanner 22 one by one by the document transport mechanism.

Alternatively, the drive unit 23 may turn the bound printed matter page by page and scan the spread or page by page with the scanner 22.

The network transmitting and receiving unit 25 is a circuit, or the like, that transmits/receives data to/from each apparatus via the network 5. The network transmitting and receiving unit 25 includes a LAN board, a wireless transmitter/receiver, a USB interface, and the like.

In addition, as described above, the inspection apparatus 6b does not have to include the network transmitting and receiving unit 25.

The storage unit 29 is a non-transitory recording medium such as a semiconductor memory of a ROM or RAM, or the like, or an HDD, or the like.

A control program for controlling the operation of the inspection apparatus 6a or the inspection apparatus 6b is stored in the ROM or HDD of the storage unit 29. In addition to this, the storage unit 29 temporarily stores the correct answer data 320 (FIG. 5) for inspecting the printed matter, as is described later.

In addition, in the design apparatus 1, the inspection apparatus 6a, and the inspection apparatus 6b, the control units 10 and 20 are integrally formed as like a CPU having built-in GPU, a chip-on module package, an SOC (System On a Chip), and the like.

Further, the control units 10 and 20 may have a built-in RAM, ROM, flash memory, or the like.

[Functional Configuration of Image Forming System X]

Figure 5:
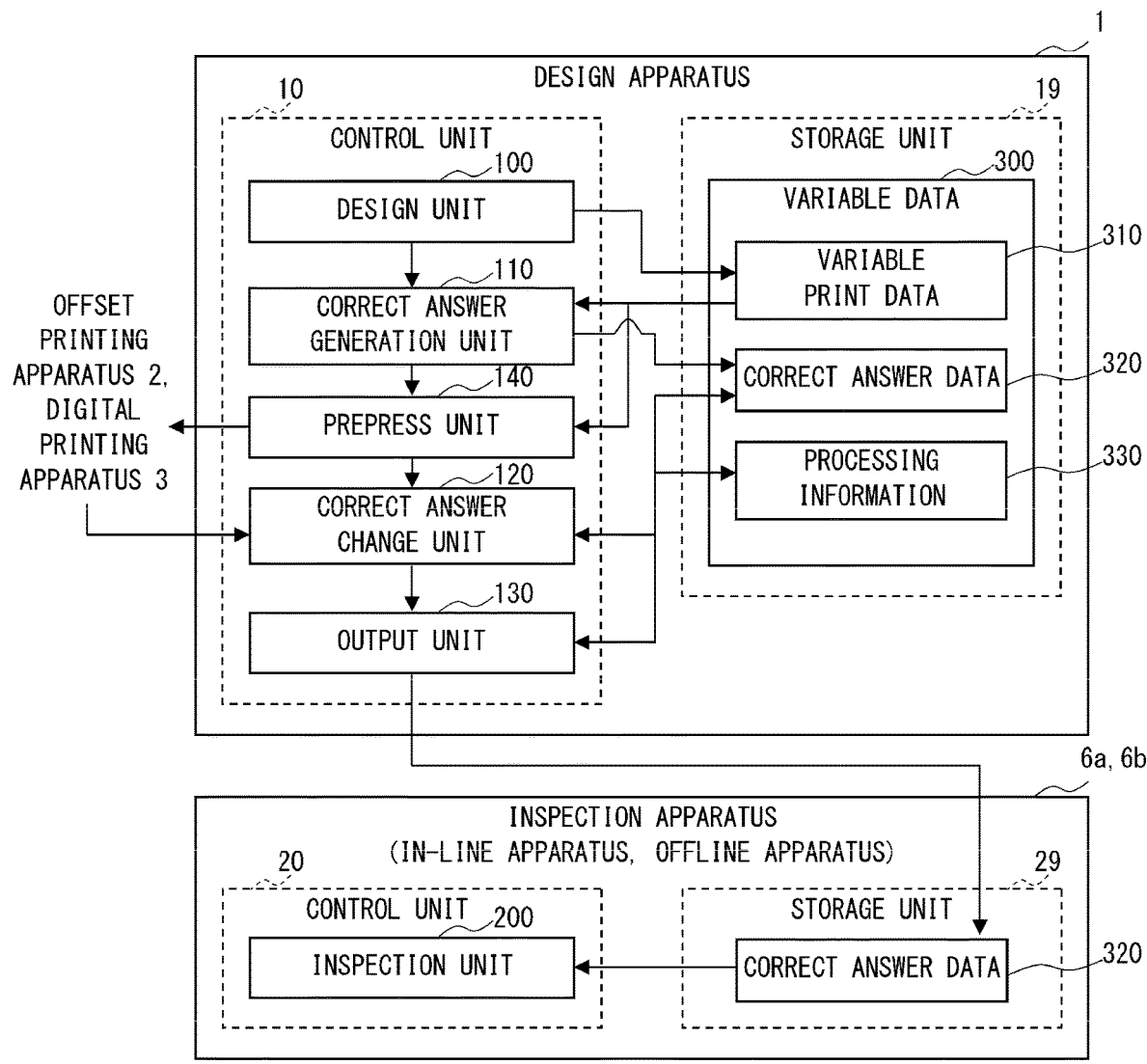
FIG. 5 is a block diagram showing a functional configuration of the image forming system according to the embodiment of the present disclosure.

Here, with reference to FIG. 5, the functional configuration of the image forming system X according to the present embodiment is described. In the present embodiment, the configurations of the design apparatus 1, the inspection apparatus 6a, and the inspection apparatus 6b is mainly described as the inspection system.

The control unit 10 of the design apparatus 1 includes a design unit 100, a correct answer generation unit 110, a correct answer change unit 120, an output unit 130, and a prepress unit 140.

The storage unit 19 stores the variable data 300.

The control unit 20 of the inspection apparatus 6 includes an inspection unit 200.

The storage unit 29 stores the correct answer data 320.

The design unit 100 designs the variable print data 310. Therefore, the design unit 100 provides a GUI (Graphical User Interface) by the design application.

The correct answer generation unit 110 generates correct answer data 320 for inspection when the variable print data 310 is created by the design unit 100.

The correct answer generation unit 110 may include one or any combination of the page number, the header, and the footer in the correct answer data 320.

Further, the correct answer generation unit 110 may include one or any combination of the cutting position, the cutting width, and the stapler position in the correct answer data 320.

The correct answer change unit 120 acquires the processing information 330 at the time of prepress and reflects it in the correct answer data 320 generated by the correct answer generating unit 110.

Here, when the inspection apparatus 6 is an in-line apparatus or a near-line apparatus connected with the network 5, the correct answer change unit 120 reflects the processing information 330 for printing and post-processing in the acquired correct answer data 320.

The output unit 130 outputs the correct answer data 320 changed by the correct answer change unit 120.

In the case of an offline apparatus such as the inspection apparatus 6b that is not connected with the network 5, the output unit 130 causes the printing apparatus to print the correct answer data 320 reflecting the processing information 330 and inspect by the printed matter.

The prepress unit 140 causes the offset printing apparatus 2 or the digital printing apparatus 3 to perform prepressing with the created variable data 300. The prepress unit 140 acquires the result of this prepress from the offset printing apparatus 2 or the digital printing apparatus 3. Then, the prepress unit 140 sets the processing information 330 of the variable data 300 as attribute data. The prepress unit 140 may also set and change this processing information 330 with a GUI.

The inspection unit 200 inspects the printed matter based on the correct answer data 320 generated by the design apparatus 1.

The inspection unit 200 inspects by determining whether or not the printed matter of variable printing before or after the printed matter printed by the offset printing apparatus 2 or the digital printing apparatus 3 is processed by the post-processing apparatus 4 is correctly printed and post-processed. At this time, the inspection unit 200 inspects by comparing the printed matter read by the scanner 22 with the correct answer data 320.

The variable data 300 is data that summarizes various data used at the time of variable printing. In the present embodiment, the data used at the time of inspection is also included in the variable data 300 and stored.

In the present embodiment, the variable data 300 includes variable print data 310, correct answer data 320, and processing information 330. These data may be included in the variable data 300 as attribute data.

The variable print data 310 includes form data and variable data used in variable printing.

The form data is data including a common form and the like for performing variable printing. The form data basically does not change at the time of printing. The form data may be, for example, data such as PDF (Portable Document Format), PDL (Page Description Language), XML (Extensible Markup Language) format PPML (Personalized Print Markup Language), and the like. The form data includes layout information that defines the layout or the like on the page. The layout information may include format information such as position (coordinates), size, font size of variable data, left-aligned, center-aligned, and right-aligned on the page of the form, or the like. Further, the form data may include definition data such as a variable data type and a format, or the like. In addition, the form data may include image data such as jpg, gif, BMP, PNG, TIFF, other document data, and other data.

The variable data is data for variable output for changing the print content at the time of printing. The variable data may be embedded in the variable print data 310, for example, in a database format such as XML. Alternatively, the variable data may be separately added as a file in a format that is easy to handle as a database. In this case, the variable data may be a database such as a tab-separated or comma-separated file, a spreadsheet application file, another type of database file, a list file, or the like.

The correct answer data 320 is data for inspection generated when the design unit 100 creates the variable print data 310. The correct answer data 320 may be, for example, PDF, PDL, XML, PPML, or the like. In the present embodiment, the correct answer data 320 is generated as data including an image from which the variable data area is removed when the variable print data 310 is created by the design application. That is, the correct answer data 320 is, for example, PDF data including image data of the correct answer image prepared from the variable print data 310. The correct answer data 320 reflects the following processing information 330 changed at the time of prepress by the correct answer change unit 120.

The processing information 330 is information including data created by the prepress processing in the offset printing, correction contents from the offset printing workflow, processing results in the offset printing, and the like. The processing information 330 may be, for example, described in JDF (Job Description Format) and/or JMF (Job Messaging Format) as the attribute data of the processing.

Specifically, the processing information 330 may include information of one or any combination of page number, header, and footer changed during the prepress processing.

Further, the processing information 330 may include information of one or any combination of cutting position, cutting width, and stapler position.

In addition, the processing information 330 may also include information of processing results such as preflight check (preflight), image enhancement, and the like, set in the variable print data 310.

Furthermore, the processing information 330 may also include information changed according to the prepress processing or post-processing, such as imposition setting, correction of imposition position, correction of milling processing designation, correction of cutting width, or the like.

Here, the control unit 10 of the design apparatus 1 is made to be function as the design unit 100, the correct answer generation unit 110, the correct answer change unit 120, the output unit 130, and the prepress unit 140 by executing the control program stored in the storage unit 19.

Further, the control unit 20 of the inspection apparatus 6a or the inspection apparatus 6b is made to function as the inspection unit 200 by executing the control program stored in the storage unit 29.

Furthermore, each part of the above-mentioned design apparatus 1 becomes a hardware resource for executing the image forming method of the present disclosure.

In addition, apart or any combination of the above-mentioned functional configurations may be configured in terms of hardware or circuit by IC, programmable logic, FPGA (Field-Programmable Gate Array), or the like.

[Variable Inspection Process by Image Formation System X]

Figure 6:
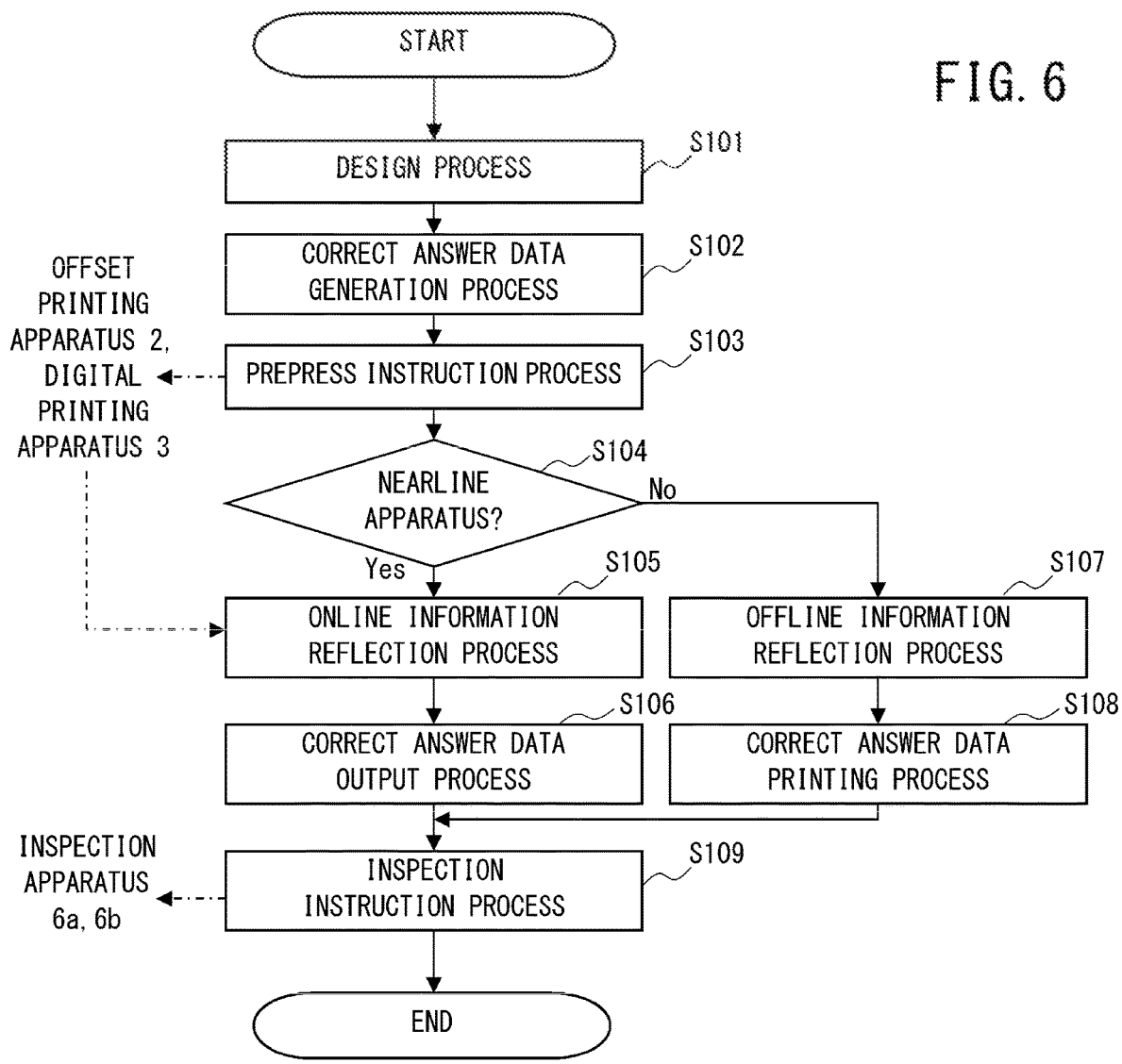
FIG. 6 is a flowchart of the variable inspection process according to the embodiment of the present disclosure.
Figure 7:
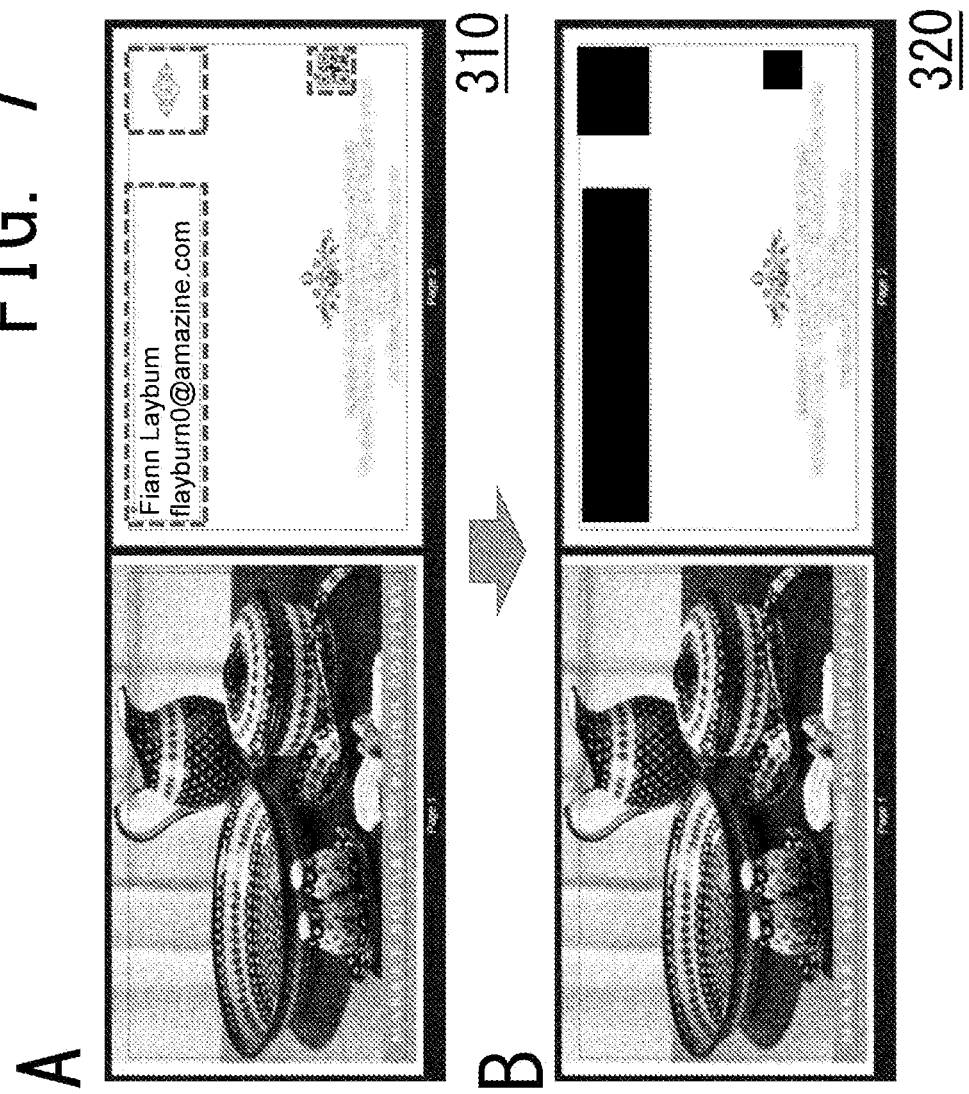
FIG. 7 is a conceptual diagram of correct answer data generated by the variable inspection process as shown in FIG. 6.
Figure 8:
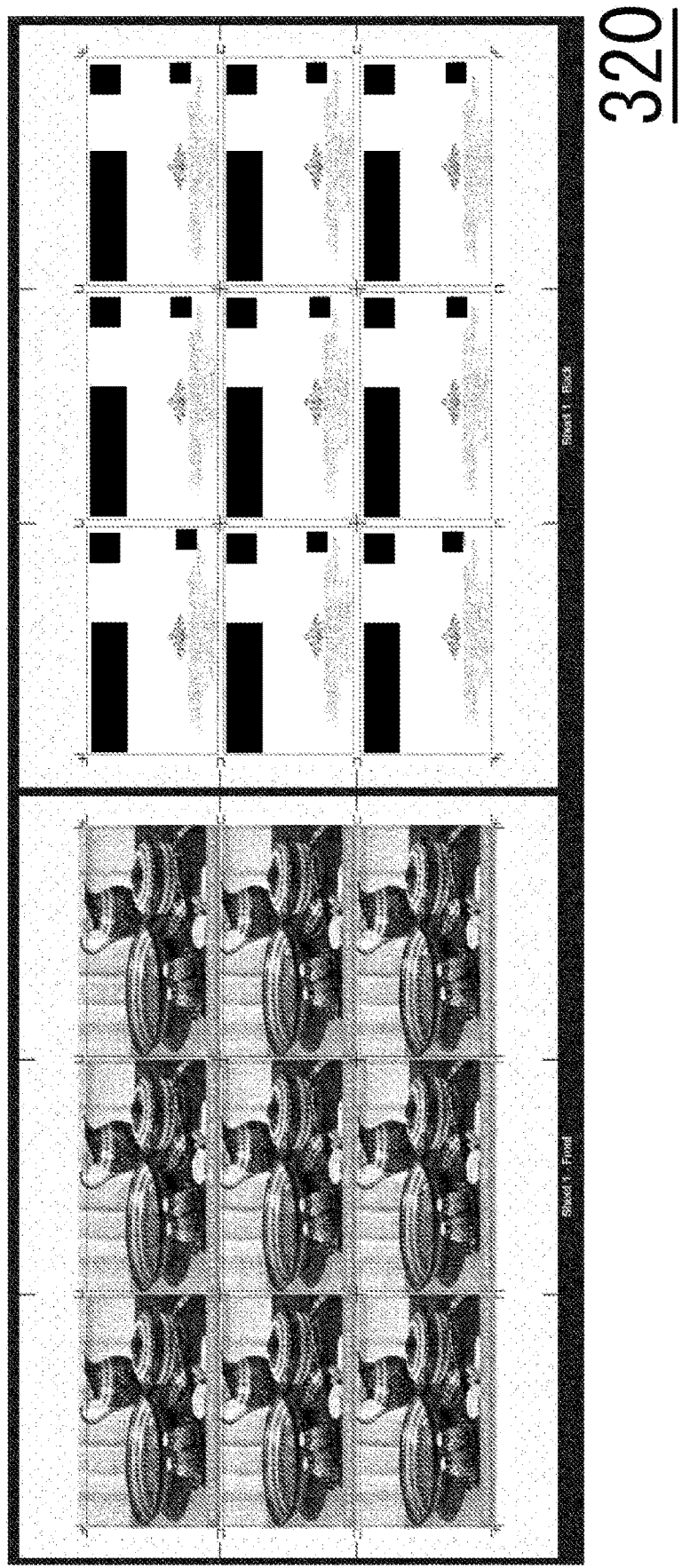
FIG. 8 is a conceptual diagram of correct answer data generated by the variable inspection process as shown in FIG. 6.

Next, with reference to FIGS. 6 to 8, the variable inspection process by the image forming system X according to the embodiment of the present disclosure is described. As the variable inspection process, the process of the inspection method for inspecting the printed matter in production printing is mainly described.

Firstly, in the variable inspection process according to the present embodiment, the variable print data 310 is designed by the design apparatus 1. At this time, the design apparatus 1 generates correct answer data 320 for inspection. Then, the prepress is executed, the processing information 330 at this time is acquired, and the processing information 330 is reflected in the correct answer data 320. Then, the design apparatus 1 outputs the correct answer data 320. As a result, the inspection apparatus 6 can inspect the printed matter based on the data.

In the variable inspection process of the present embodiment, mainly, the control unit 10 of the design apparatus 1 and the control unit 20 of the inspection apparatus 6 executes the control program stored in the storage unit 19 and the storage unit 29 in cooperation with each unit using hardware resources, respectively.

In the following, with reference to the flowchart of FIG. 6, the details of the processing by the design apparatus 1 is mainly described step by step.

(Step S101)

At first, the design unit 100 performs the design process.

When the design application is activated by the design apparatus 1, the design unit 100 accesses or creates the variable data 300 and designs the variable print data 310. At this time, the design unit 100 acquires the user's instruction from the GUI of the design application in the input unit 16 and the display unit 17, and it creates the variable print data 310 based on the user's instruction.

(Step S102)

Then, the correct answer generation unit 110 performs the correct answer data generation process.

The correct answer generation unit 110 generates the correct answer data 320 when the variable print data 310 is created by the design unit 100. The correct answer generation unit 110 may generate, for example, the correct answer data 320 at the time of storing the variable print data 310 in the variable data 300 on the design application.

With reference to FIG. 7, the generation of specific correct answer data 320 is described.

The element "A" of FIG. 7 is an example of the variable print data 310 created by the design application. At this time, the correct answer generation unit 110 sets a variable region in which variable data is drawn. Here, the region indicated by the broken line square is the variable region. The correct answer generation unit 110 adds this variable region to the variable data 300. In addition, in this example, the name, the e-mail address, the company mark, and the two-dimensional barcode are variable in each copy as the variable region. Other places are printed commonly in each form. Here, just as an example, a postcard image of pottery advertisement is shown.

The element "B" of FIG. 7 shows an example of the generated correct answer data 320. As in this example, the correct answer generation unit 110 generates correct answer data 320 for inspection by cutting out the variable region added to the variable data 300 with a rectangle. Specifically, the variable region as shown in the element "A" is filled with black. In addition, in this example, although the variable region is painted in black, it may be painted with a special color, or the like, indicating a region not detected in the inspection by the inspection apparatus 6.

(Step S103)

Then, the prepress unit 140 performs the prepress instruction process.

Here, after the design by the design application is completed and the variable data 300 is created, the prepress application is started.

At this time, the prepress unit 140 instructs the offset printing apparatus 2 and/or the digital printing apparatus 3 to prepress the variable data 300.

As a result, the test printing by the offset printing apparatus 2 and/or the digital printing apparatus 3 is executed, and further, the post-processing by the post-processing apparatus 4 is also performed depending on the instruction.

The prepress unit 140 acquires the printing result of the printed matter and the processing result of the post-processing from the offset printing apparatus 2, the digital printing apparatus 3, and the post-processing apparatus 4. On this basis, the prepress unit 140 stores the processing information 330 related to the adjustment regarding the printing result and the processing result in the storage unit 19. Here, the prepress unit 140 may acquire an instruction in the GUI of the prepress application by the user and perform the adjustment. As a result, the prepress unit 140 makes various adjustments for printing and post-processing. These various adjustments include adjustments for page number, header, footer, cutting position, cutting width, staple position, and the like.

In addition, these adjustments may be performed by the offset printing apparatus 2, the digital printing apparatus 3, and the post-processing apparatus 4.

(Step S104)

Then, the correct answer change unit 120 determines whether or not the inspection apparatus 6 for inspecting is a near-line apparatus. The correct answer change unit 120 determines Yes if inspecting with the inspection apparatus 6a, which is a near-line apparatus. The correct answer change unit 120 determines No if inspecting with the inspection apparatus 6b, which is an offline apparatus.

In the case of Yes, the correct answer change unit 120 advances the process to step S105.

In the case of No, the correct answer change unit 120 advances the process to step S107.

In addition, the correct answer change unit 120 may be able to set the result of this determination in the correct answer data 320 of the variable data 300 as attribute data.

(Step S105)

If the inspection apparatus 6a of the near-line apparatus is used for inspection, the correct answer change unit 120 performs online information reflection process.

After the design and prepress processing, that is, in a state where the production printing of the variable print data 310 is possible, the correct answer change unit 120 acquires the processing information 330 stored in the storage unit 19.

Then, the correct answer change unit 120 redraws or corrects the correct answer data 320 based on the processing information 330 and reflects it in the generated correct answer data 320.

In the present embodiment, the correct answer change unit 120 draws with various parameters adjusted according to the result of the prepress processing of the variable print data 310. That is, the correct answer change unit 120 generates the correct answer data 320 to which the processing information 330 of the prepress processing is applied.

Specifically, the correct answer change unit 120 reflects the addition of page number, header, footer, or the like, to the correct answer data 320.

In addition, the correct answer change unit 120 also reflects the result of the imposition processing in the correct answer data 320.

Further, the correct answer change unit 120 may also reflect the processing such as preflight and image enhancement performed on the variable print data 310 in the correct answer data 320 for inspection.

FIG. 8 shows an example of correct answer data 320 in which the processing information 330 is reflected in this way. Again, the variable region is filled with black, or the like, as like the element "B" in FIG. 7.

As a result, as described above, the PDF, or the like, where adjustment information regarding one or any combination of page number, header, footer, and/or one or any combination of cutting position, cutting width, and stapler position is reflected to the correct answer data 320 is generated.

(Step S106)

Then, the output unit 130 performs the correct answer data output process.

The output unit 130 acquires the correct answer data 320 in the state changed by the correct answer change unit 120 from the attribute data of the variable data 300, and it outputs the correct answer data 320 to the inspection apparatus 6a via the network 5.

The inspection unit 200 of the inspection apparatus 6a acquires this correct answer data 320 and stores it in the storage unit 29.

After that, the output unit 130 advances the process to step S109.

(Step S107)

If the inspection apparatus 6b of the offline apparatus is used for inspection, the correct answer change unit 120 performs offline information reflection process.

The correct answer change unit 120 acquires the processing information 330 at the time of prepress and reflects it in the correct answer data 320. This process is performed in the same manner as in step S105 described above.

(Step S108)

Next, the output unit 130 performs the correct answer data printing process.

In the present embodiment, in the case of the inspection apparatus 6b of the offline apparatus, the correct answer data 320 for inspection is also printed out. Therefore, the output unit 130 causes the offset printing apparatus 2 or the digital printing apparatus 3 to print the correct answer data 320 in which the processing information 330 is reflected and the variable portion is masked. In addition to this, the output unit 130 may post-process the printed matter by the post-processing apparatus 4.

The inspection unit 200 of the inspection apparatus 6b acquires the printed matter of the correct answer data 320, reads it by the scanner 22, and stores it in the storage unit 29 as the correct answer data 320. This makes it possible to scan and compare the correct answer data 320 for inspection and the actual printed matter.

(Step S109)

Here, the output unit 130 performs inspection instruction process.

At the time of inspection, the output unit 130 instructs the inspection apparatus 6a to inspect with the transmitted correct answer data 320 by a job.

Alternatively, for the inspection apparatus 6b, the user can instruct the inspection of the printed matter placed on the transport unit with a button, or the like.

As a result, the inspection unit 200 of the inspection apparatus 6a or the inspection apparatus 6b inspects based on the correct answer data 320.

Here, the inspection unit 200 can handle either an inspection in which the variable print data 310 is printed (after printing) or an inspection after post-processing by the post-processing apparatus 4. That is, the inspection may be performed before or after the post-processing.

As described above, the variable inspection process according to the embodiment of the present disclosure is completed.

As configured in this way, the following effects can be obtained.

In the variable printing of typical production printing, the page containing variable data and the page not containing variable data are often printed separately after design creation and proofreading. For example, a common form may be printed by offset printing, or the like, and variable data may be overlaid printed by using it as preprinted paper. In addition, pages that do not include variable data are printed as they are by offset printing, or the like. After that, the final printed matter is finished and manufactured by printing with insertion, collating, or the like.

On the other hand, when inspecting a printed matter of production printing, it is conceivable to compare and check the scanned image of the printed matter and the image of the correct answer prepared in advance.

Regarding variable printing, it was difficult to inspect by simple image comparison because different variable data was added to each copy.

However, in a typical technology, when RIP processing is performed by one digital printing apparatus, a margin is detected to discriminate between a fixed region, a variable region, and a margin region, and data for inspection is generated. Therefore, it cannot be applied to production printing by using a plurality of apparatuses.

On the other hand, the image forming system X according to the embodiment of the present disclosure is an inspection system having a design apparatus 1 and an inspection apparatus 6 for production printing, wherein the design apparatus 1 includes: a design unit 100 that designs variable print data 310, a correct answer generation unit 110 that generates correct answer data 320 for inspection when the variable print data 310 is created by the design unit 100, a correct answer change unit 120 that acquires processing information 330 at the time of prepress and reflect in the correct answer data 320 generated by the correct answer generation unit 110, and an output unit 130 that outputs the correct answer data 320 changed by the correct answer change unit 120; and the inspection apparatus 6 includes: an inspection unit 200 that inspects based on the correct answer data 320 generated by the design apparatus 1.

With this configuration, when designing the variable data 300, the correct answer data 320 is generated, and the correct answer data 320 for inspection that reflects the processing information 330 as a result of the subsequent prepress processing is generated. This enables inspection even in a production printing system by using a plurality of apparatuses.

Furthermore, in a typical technology, since the printed matter is inspected with digital print data, it is not possible to reflect the adjustment processing result, or the like, in the offset printing.

On the other hand, in the image forming system X according to the present embodiment, the correct answer data 320 can be generated at the time of design creation and prepress processing in the upstream process. Therefore, even if the adjustment is performed not only on the digital printing but also on the printed matter by the offset printing, the processing result of this adjustment can be acquired and the inspection by the variable printing becomes possible.

Further, in the image forming system X according to the present embodiment, the same processing as the print target data is automatically reflected in the inspection correct answer data 320 at the time of the variable processing and the prepress processing. Thus, the correct answer data 320 of the variable printed matter can be easily generated. Therefore, special printing, or the like, is not necessary at the time of inspection, and human resources and labor for inspection can be reduced.

Further, in a typical technique, during digital printing, a processing load is applied to the process of determining between a fixed area, a variable area, and a margin area, and the performance at the time of printing is deteriorated.

On the other hand, the image forming system X according to the present embodiment can automatically generate the correct answer data 320 at the time of design creation. Therefore, the processing can be performed without adding an extra processing time to the printing process.

In the image forming system X according to the embodiment of the present disclosure, when the inspection apparatus 6 is an in-line apparatus or a near-line apparatus connected with the network 5, the correct answer change unit 120 reflects the acquired correct answer data 320 in the processing information 330 of printing and post-processing.

With this configuration, in the case of the inspection apparatus 6a according to the present embodiment, it is possible to acquire and inspect the correct answer data 320 reflecting the processing information 330 of printing and post-processing at the time of prepress. At this time, processing such as page processing for checking for mistakes of missing pages, or the like, can be reflected in the correct answer data 320, and more accurate comparison can be performed.

In the image forming systemX according to the embodiment of the present disclosure, when the inspection apparatus 6 is an offline apparatus that is not connected with the network 5, the output unit 130 causes printing apparatus to print the correct answer data 320 reflecting the processing information 330 and inspect by the printed matter.

With this configuration, even an offline apparatus such as the inspection apparatus 6b according to the present embodiment can perform inspection based on the correct answer data 320 in which the processing information 330 is reflected.

In the image forming systemX according to the embodiment of the present disclosure, the correct answer generation unit 110 includes one or any combination of page number, header, and footer in the correct answer data 320.

With this configuration, correct answer data 320 can be generated according to the adjustment of page number, header, footer, or the like, at the time of prepress. As a result, more accurate inspection can be performed.

In the image forming system X according to the embodiment of the present disclosure, the correct answer generation unit 110 includes one or any combination of the cutting position, the cutting width, and the stapler position in the correct answer data 320.

With this configuration, the correct answer data 320 can be generated by reflecting the adjustment of the cutting width, the stapler position, and the like. As a result, more accurate inspection can be performed by comparing with the actual printed matter in consideration of the result at the time of printing.

Other Embodiments

In addition, in the above-described embodiment, an example is described in which it is determined whether the inspection apparatus 6 is a near-line apparatus or an offline apparatus after prepressing, and processing is performed for each of them.

However, when actually performing the inspection, a near-line apparatus or an offline apparatus may be selected, and the inspection reflecting the correct answer data 320 may be performed by the selection.

Specifically, after the inspection instruction process in FIG. 5 as described above, a job, or the like, may instruct whether to inspect with the near-line apparatus or the offline apparatus. In this case, the correct answer change unit 120 may detect whether the apparatus is the near-line apparatus or the offline apparatus from the attribute data of the correct answer data 320, and it perform processing for the respective apparatus depending on the detection result.

In addition, in the above-described embodiment, an example is described in which the job and workflow configurations do not change and the apparatus used for printing does not change after the prepress.

However, in the case of printing in small lots after printing the variable data 300, or the like, it is possible that printing is performed only by the digital printing apparatus 3 without using the offset printing apparatus 2. Alternatively, although the offset printing is not used during prepress printing, the offset printing and digital printing may be used properly during actual printing.

In such a case, the correct answer change unit 120 may change the correct answer data 320 reflecting the processing information 330 so as to be the same as the printing result of the actual variable data 300 according to the change of the print job or the workflow.

With such a configuration, more reliable inspection of the printed matter can be performed.

Further, in the above-described embodiment, an example in which the product is inspected by either the near-line apparatus or the offline apparatus is described.

However, the configuration may be such that both the near-line apparatus and the offline apparatus are used. In this case, it is also possible to prepare both the correct answer data 320 for the near-line apparatus and the correct answer data 320 for the offline apparatus.

Furthermore, as described above, it is also possible to inspect the product before the post-processing by the post-processing apparatus 4 and then inspect the product after the post-treatment. In this case as well, the correct answer data 320 for inspecting the product before the post-processing and the correct answer data 320 for inspecting the product after the post-processing may be prepared, respectively. Further, when a plurality of post-processing apparatuses 4 are used, it is possible to prepare correct answer data 320 for each of them.

With such a configuration, it is possible to support a flexible configuration.

In the above-described embodiment, an example in which the inspection apparatus 6a and the inspection apparatus 6b are an in-line apparatus or an offline apparatus, respectively, is described.

However, it is also possible to use the inspection apparatus 6 of the near-line apparatus connected with another apparatus by USB, RS-232C, or the like. In this case as well, it may be possible to acquire the correct answer data 320 from another apparatus via USB, RS-232C, or the like, as in the case of the in-line apparatus. Alternatively, it may be possible to introduce the correct answer data 320 into the inspection apparatus 6 from an external recording medium such as a flash memory.

Further, even with the inspection apparatus 6a, it may be possible to scan the printed matter of the correct answer data 320 and use it for inspection.

Further, in the above-described embodiment, an example in which the adjustment processing result is acquired from the offset printing apparatus 2 or the digital printing apparatus 3 and used as the processing information 330 is described.

However, the processing information 330 may be set directly by the user in the prepress application.

Further, in the above-described embodiment, an example that processing information 330 is attribute data of processing described in JDF and/or JMF has been described. However, as the processing information 330, it may be possible to use data in a format such as a macro language or a programming language.

Further, in the above-described embodiment, although an example of performing variable printing on a printed matter of paper as production printing is described, it can be applied to other production printing.

For example, it is also applicable to variable book printing, on-demand printing, and other printing.

Alternatively, it can be used, for example, for split printing of large-format posters, sheet printing for exteriors and interiors of aircraft and automobiles, production of electronic components such as flat displays and electronic substrates, printing of cultured cells, and the like. In this case, as a component unit, it is also possible to use an industrial inkjet printer, an industrial robot, various reactors, a culture apparatus, or the like.

With this configuration, it can be used for various purposes.

Further, in the above-described embodiment, an example in which the design apparatus 1 is used up to prepress is described.

However, a server that manages the workflow may be used, or a management terminal dedicated to performing prepress may be used.

Further, it goes without saying that the configuration and operation of the above-described embodiment are examples, and it can be appropriately modified and executed without departing from the gist of the present disclosure.

What is claimed is:

1. An inspection system having a design apparatus and an inspection apparatus for production printing, wherein
the design apparatus comprises:
a design unit configured to design variable print data,
a correct answer generation unit configured to generate correct answer data for inspection when the variable print data is created by the design unit,
a correct answer change unit configured to acquire processing information at the time of prepress and reflect it in the correct answer data generated by the correct answer generation unit, and
an output unit configured to output the correct answer data changed by the correct answer change unit; and
the inspection apparatus comprises:
an inspection unit configured to inspect based on the correct answer data generated by the design apparatus.

2. The inspection system according to claim 1, wherein
the correct answer change unit, when the inspection apparatus is an in-line apparatus or a near-line apparatus connected with a network, reflects in the correct answer data the acquired processing information for printing and post-processing.

3. The inspection system according to claim 1, wherein
the output unit, when the inspection apparatus is an offline apparatus that is not connected with the network, causes a printing apparatus to print the correct answer data reflecting the processing information and inspect by printed matter.

4. The inspection system according to claim 1, wherein
the correct answer generation unit includes one or any combination of page number, header, and footer in the correct answer data.

5. The inspection system according to claim 1, wherein
the correct answer generation unit includes one or any combination of cutting position, cutting width, and stapler position in the correct answer data.

6. A design apparatus for production printing comprising:
a design unit configured to design variable print data;
a correct answer generation unit configured to generate correct answer data for inspection when the variable print data is created by the design unit;
a correct answer change unit configured to acquire processing information at the time of prepress and reflect it in the correct answer data generated by the correct answer generation unit; and
an output unit configured to output the correct answer data changed by the correct answer change unit.

7. The design apparatus according to claim 6, wherein
the correct answer change unit, when an inspection apparatus is an in-line apparatus or a near-line apparatus connected with a network, reflects in the correct answer data the acquired processing information for printing and post-processing.

8. The design apparatus according to claim 6, wherein
the output unit,
when an inspection apparatus is an offline apparatus that is not connected with the network, causes a printing apparatus to print the correct answer data reflecting the processing information and inspect by printed matter.

9. The design apparatus according to claim 6, wherein
the correct answer generation unit includes one or any combination of page number, header, and footer in the correct answer data.

10. The design apparatus according to claim 6, wherein
the correct answer generation unit includes one or any combination of cutting position, cutting width, and stapler position in the correct answer data.

11. An inspection method executed by an inspection system having a design apparatus and an inspection apparatus for production printing, comprising the steps of:
by the design apparatus, designing variable print data;
by the design apparatus, generating correct answer data for inspection when the variable print data is created;
by the design apparatus, acquiring the processing information at the time of prepress and reflecting it in the generated correct answer data;
by the design apparatus, outputting changed the correct answer data; and
by the inspection apparatus, inspecting based on the correct answer data generated by the design apparatus.

12. The inspection method according to claim 11, wherein
by the design apparatus, when the inspection apparatus is an in-line apparatus or a near-line apparatus connected with a network, reflecting in the correct answer data in the acquired processing information for printing and post-processing.

13. The inspection method according to claim 11, wherein
by the design apparatus, when the inspection apparatus is an offline apparatus that is not connected with the network, causing a printing apparatus to print the correct answer data reflecting the processing information and inspect by printed matter.

14. The inspection method according to claim 11, wherein
by the design apparatus, including one or any combination of page number, header, and footer in the correct answer data.

15. The inspection method according to claim 11, wherein
by the design apparatus, including one or any combination of cutting position, cutting width, and stapler position in the correct answer data.

\* \* \* \* \*